United States Patent [19]

Laqua

[11] Patent Number: 4,859,155
[45] Date of Patent: Aug. 22, 1989

[54] BYPASS VALVE FOR A DISPLACEMENT PUMP

[75] Inventor: Fred L. Laqua, Wichita, Kans.

[73] Assignee: Great Plains Industries, Inc., Wichita, Kans.

[21] Appl. No.: 112,536

[22] Filed: Oct. 21, 1987

[51] Int. Cl.$^4$ .............. F04B 49/02; F16K 17/04; F16K 17/10

[52] U.S. Cl. .............. 417/307; 137/540; 137/514.3; 137/514.7

[58] Field of Search .............. 417/307, 308, 540, 542; 137/540, 514.3, 514.7

[56] References Cited

U.S. PATENT DOCUMENTS

| | | |
|---|---|---|
| 1,621,913 | 3/1927 | Longacre . |
| 1,760,849 | 5/1930 | Pomeroy .............. 417/307 |
| 1,853,391 | 4/1932 | Westman et al. .............. 417/307 |
| 1,943,765 | 1/1934 | Jones . |
| 2,301,435 | 11/1942 | Mercier . |
| 2,619,907 | 12/1952 | Paterson . |
| 2,632,458 | 3/1953 | Slomer .............. 137/108 |
| 2,667,894 | 2/1954 | Towler et al. .............. 137/514.7 |
| 3,438,391 | 4/1969 | Yocum .............. 137/540 |
| 3,680,587 | 8/1972 | Herscovici .............. 137/514.3 |
| 3,938,425 | 2/1976 | Kroffke .............. 92/60.5 |
| 4,231,228 | 11/1980 | Galvin et al. .............. 62/77 |
| 4,527,580 | 7/1985 | Chheda .............. 137/1 |
| 4,740,140 | 4/1988 | Benson .............. 417/310 |

FOREIGN PATENT DOCUMENTS

| | | | |
|---|---|---|---|
| 227046 | 9/1962 | Austria .............. | 137/514.3 |
| 49489 | 10/1931 | Denmark .............. | 137/540 |

*Primary Examiner*—William L. Freeh
*Attorney, Agent, or Firm*—Bill D. McCarthy

[57] ABSTRACT

A displacement pump bypass valve having an integral pressure modulator in a piston of the valve, the piston located in a bore formed through the pump housing between the pump inlet and pump outlet, the piston having an internal, cylindrical expansion chamber which fluidly communicates with the pump outlet via an opening formed through one end of the piston. A modulator disc is located in the expansion chamber for axial movement therein to vary the expansion chamber volume, and a spring in the expansion chamber urges the modulator disc toward the opening in the expansion chamber.

6 Claims, 2 Drawing Sheets

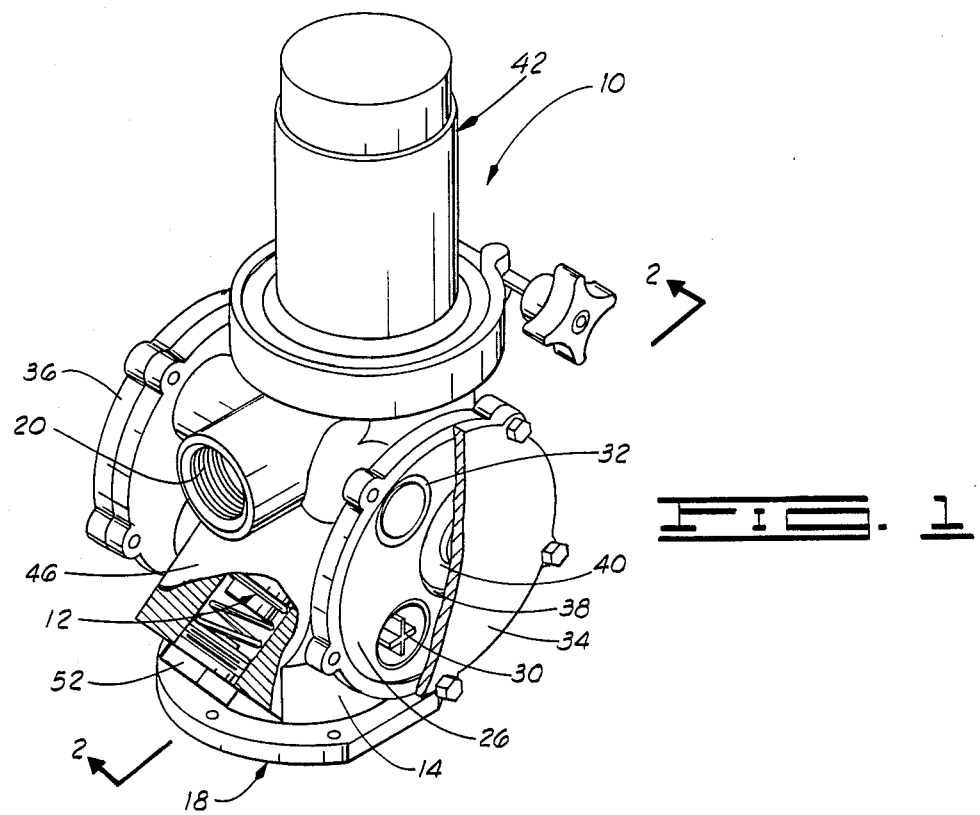
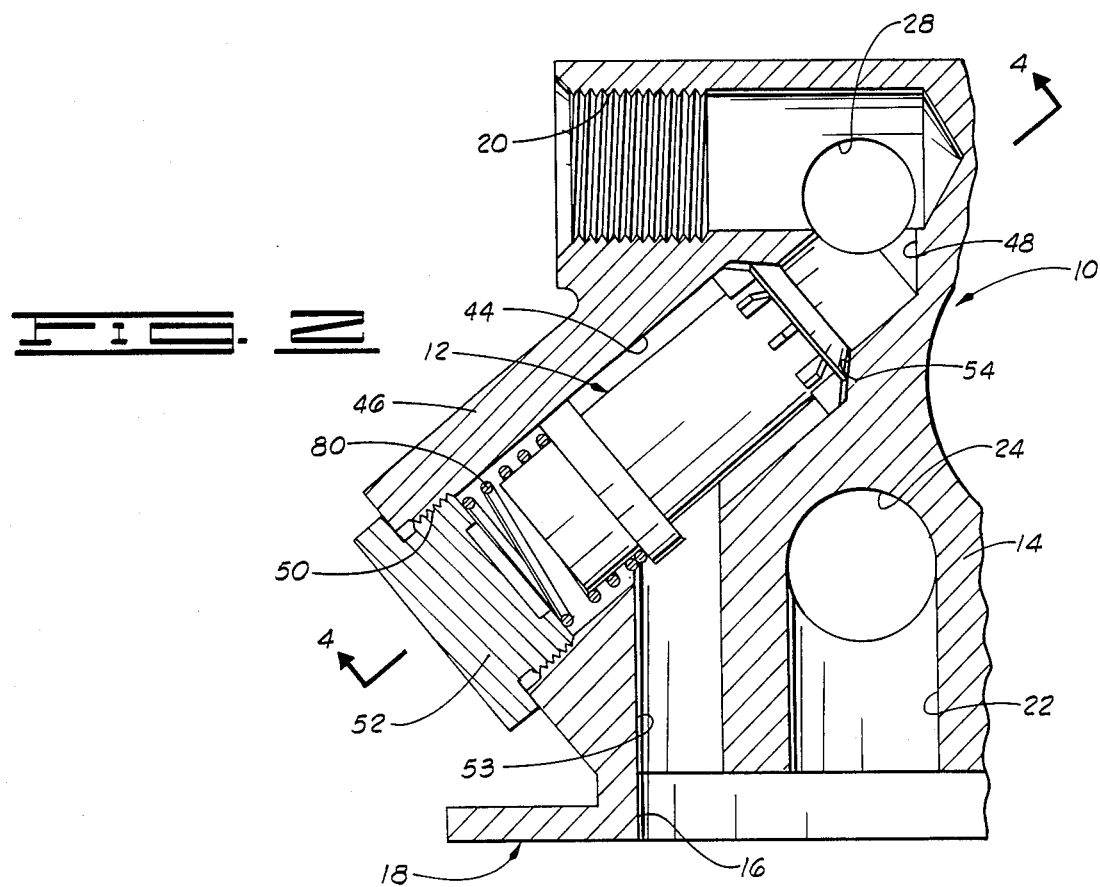

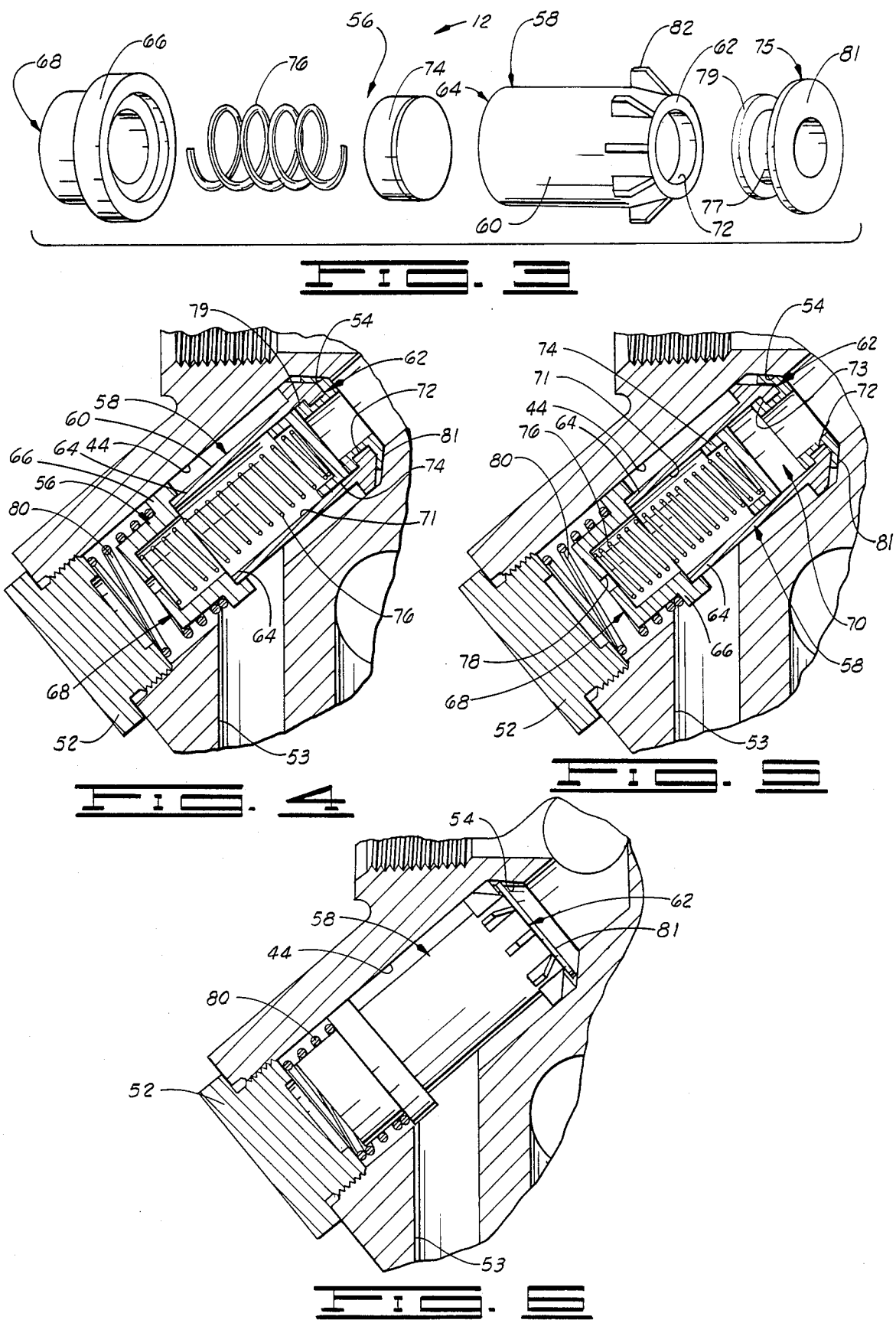

BYPASS VALVE FOR A DISPLACEMENT PUMP

BACKGROUND OF THE INVENTION

1. Field of the Invention

The present invention relates generally to improvements in hydraulic pressure release bypass valves, and more particularly, but not by way of limitation, to improvements in bypass valves for constant displacement pumps.

2. Brief Description of the Prior Art

In many applications of hydraulic pumps, it is desired that a pump deliver pressurized hydraulic fluid at a substantially constant rate by volume while the pressure at which the fluid is delivered is permitted to vary. For example, the pump might be used to drive a hydraulic motor at constant speed against a load that varies with time. A constant displacement pump is ideal for such applications. Pumps of this type are constructed to draw in a fixed amount of fluid for each operating cycle of the pump and discharge the same amount of fluid so that the delivery rate remains constant. The pressure at the pump outlet is then determined by the load.

The constant volume at varying pressure characteristics of such pumps can result in a problem should the hydraulic fluid system receiving the hydraulic fluid from the pump become blocked. For example, should the load on a hydraulic motor become large enough to stop the motor, the pump will be operating on a trapped volume of substantially incompressible hydraulic fluid with the effect that the operation of the pump can be violently halted. This halt can damage the pump and, if the pump is driven by an electric motor, burn out the motor. These results are commonly avoided by providing the pump with a bypass valve that diverts fluid being delivered from the pump outlet to the pump inlet should the pressure at the outlet rise to a preselected value.

Prior art bypass valves have, in the past, given rise to a second problem. In many circumstances, the nature of the load on the pump will give rise to pressure surges in the pump outlet that, if unrelieved, will suffice to operate the bypass valve even though no blockage of flow of hydraulic fluid from the pump has occurred. In extreme cases, the resulting bypassing of the system downstream of the pump can result in a cessation of operation of such system with the result that continued operation of the pump merely cycles hydraulic fluid between the inlet and outlet thereof. In less extreme cases, the diversion of fluid from the downstream system to the pump inlet results in a loss of operating efficiency of the pump.

SUMMARY OF THE INVENTION

The present invention solves these problems by providing a bypass valve that will modulate pressure surges at the outlet of a displacement pump to prevent diversion of fluid to the pump inlet in the absence of a blockage to fluid flow from the pump outlet while retaining the capability of the valve to bypass a system downstream of the pump should a blockage occur. To this end, the bypass valve of the present invention is comprised of a piston located in a bore that fluidly communicates the pump outlet with the pump inlet. As in conventional bypass valves, a spring urges the piston against a valve seat at the end of the bore in communication with the pump outlet so that excessive pressure in the pump outlet arising from a blockage of flow through the system receiving the effluent from the pump will unseat the piston to divert the effluent to the pump inlet. Thus, the bypass valve of the present invention can operate in a conventional manner to prevent damage to the pump or the motor that drives the pump.

In order to modulate pressure surges that have, in the past, resulted in undesirable operation of the bypass valve, an expansion chamber is formed in the piston to fluidly communicate with the pump outlet via an opening in one end of the piston and a modulation disc is slidably mounted in the expansion chamber. A spring is positioned in the expansion chamber to urge the modulation disc toward the opening in the end of the piston so that an increase in the resistance to fluid flow from the pump will compress the spring and temporarily store a portion of the pump effluent in the piston for delivery when the resistance to fluid flow from the pump decreases. Should a blockage of flow occur, the spring urging the modulation disc toward the opening in the piston will be maximally compressed to prevent further entrance of fluid into the piston so that the bypass valve can operate in a conventional manner to divert hydraulic fluid from the pump outlet to the pump inlet.

An object of the present invention is to provide a bypass valve for a constant displacement pump that will eliminate diversion of pressurized hydraulic fluid from the pump outlet to the pump inlet in the absence of a blockage to fluid flow from the pump while still enabling such diversion in the presence of a blockage.

Another object of the invention is to increase the efficiency of operation of constant displacement pumps by maintaining flow from such pumps at a reduced level at such times that increased resistance to fluid flow is encountered while storing fluid for delivery when resistance is lowered.

Yet another object of the invention is to modulate the outlet pressure of constant displacement pumps to eliminate pressure surges that might operate a bypass valve while maintaining the capacity of the valve to protect a pump.

Other objects, advantages and features of the bypass valve of the present invention will become clear from the following detailed description when read in conjunction with the drawing and appended claims.

Brief Description of the Drawings

FIG. 1 is an isometric view of a displacement pump containing a bypass valve constructed in accordance with the present invention.

FIG. 2 is a fragmentary section along line 2—2 of FIG. 1 illustrating the bypass valve in longitudinal cross section.

FIG. 3 is an exploded view of the piston assembly of the bypass valve.

FIGS. 4 through 6 are fragmentary cross sections taken along line 4—4 of FIG. 2 illustrating different stages in the operation of the bypass valve.

DESCRIPTION OF THE PREFERRED EMBODIMENT

Referring now to the drawings in general and to FIGS. 1 and 2 in particular, shown therein and designated by the general reference number 10 is a displacement pump having an integral bypass valve 12 constructed in accordance with the present invention. While the inclusion of the valve 12 in the pump 10 is preferable, it will be recognized the valve 12 can be constructed separately from the pump 10. In order to place the characteristics of the valve 12 in context, it will be useful to precede the description of the valve 12 with a brief discussion of the pump 10.

The pump 10 is generally comprised of a housing 14 having an inlet 16 (FIG. 2), through which hydraulic fluid can be drawn into the bottom 18 of the pump 10, and an outlet 20 from which the fluid is discharged. As shown in FIG. 2, a duct 22 communicates the inlet 16 with a cross bore 24 that extends laterally through the housing 14 to intersect the ends thereof as shown for one end 26 in FIG. 1. A second cross bore 28 (FIG. 2) similarly extends laterally through the housing 14 to intersect the ends thereof and the cross bore 28 intersects the outlet 20.

The cross bore 24 contains two conventional check valves 30 (only one check valve 30 has been illustrated in the drawings) to limit fluid flow between the pump inlet 16 and the ends of the housing 14 to a direction from the inlet to the ends of the housing. Similarly, the cross bore 28 contains two check valves 32, only one of which has been illustrated in the drawings, to limit fluid flow between the outlet 20 and the housing ends to a direction from the housing ends to the outlet. Portions of the ends of the housing 14 intersected by the cross bores 24 and 28 are depressed to provide for fluid communication between the cross bores 24 and 28 across the ends of the housing 14. Such ends are sealed by plates 34 and 36 that are bolted across the ends of the housing. Thus, the cross bores 24 and 28 form two unidirectional fluid flow paths between the pump inlet 16 and pump outlet 20, each path extending across one end of the housing 14.

A pump bore 38 is formed laterally through central portions of the housing 14, to intersect the depressed portions of the ends of the housing 14, and the pump bore 38 contains a piston assembly 40 that can be reciprocated in the pump bore 38 by a conventional mechanical linkage (not shown) driven by an electric motor 42 mounted atop the housing 14. Thus, pumping of fluid through the pump 10 is effected by moving the piston assembly 40 laterally in one direction to draw hydraulic fluid from the inlet 16 into one end of the pump bore 38, via the cross bore 24, while discharging hydraulic fluid to the pump outlet 20 from the other end of the pump bore 38 via the cross bore 28. Reversal of the direction of movement of the piston assembly 40 reverses the ends of the pump bore which receive and discharge hydraulic fluid so that the pump will deliver a fixed volume of fluid from the outlet 20 for each reciprocation of the piston assembly 40.

Turning now to the bypass valve 12, the drawings illustrate the situation in which the valve is formed integrally with the pump 10 and, in this situation, a valve bore 44 is formed in a portion of the housing 14 between the inlet 16 and outlet 20 to provide a case 46 for the valve 12. As shown in FIG. 2, a first end 48 of the bore 44 intersects the cross bore 28 to provide fluid communication between the outlet 20 and the bore 44. The opposite, second end 50 of the bore 44 is threaded to receive a plug 52 which closes such end of the bore 44. A duct 53 intersects the bore 44, near the second end thereof, and extends to the pump inlet 16 to provide a return path from the outlet 20 to the inlet 16 that bypasses hydraulic systems downstream of the outlet 20. For a purpose to be discussed below, portions of the bore 44 near the first end 48 thereof are formed on a reduced diameter and a conical valve seat 54 (see especially FIG. 6) facing the second end 50 of the bore 44 is formed about the bore adjacent the end 48.

The valve 12 is comprised of a valve assembly 56 which has been particularly illustrated in FIG. 3 to which attention is now invited. The valve assembly 56 is comprised of a piston 58 which is formed in two parts. In particular, the piston 58 is comprised of a tubular barrel 60, having a first end that forms a first end 62 for the piston 58 and an opposite second end 64. As can be seen in FIG. 4, the second end 64 of the barrel 60 is open and the piston 58 is further comprised of a cup-shaped cap 66 that fits over the open second end 64 of the barrel 60, the external end of the cap 66 forming a second end 68 of the piston 58. The bore 71 of the barrel 60 thus forms an expansion chamber 70 (FIG. 5) within the piston 58 and the expansion chamber 70 is fluidly communicated with the first end 62 of the piston 58 via an opening 72 through the first end 62 of the piston 58.

Within the expansion chamber 70, the valve assembly 56 is further comprised of a cup-shaped modulator disc 74 that opens in the direction toward the cap 66 and a modulator spring 76 that fits within the modulator disc 74 and extends to the cap 66 to urge the modulator disc toward the opening 72 through the first end 62 of the piston 58. A shoulder 73, formed within the bore 71 adjacent the first end of the piston 58, limits the movement of the modulator disc 74 toward the first end of the piston 58 so that the modulator disc can move axially within the barrel 60 to vary the volume of the expansion chamber 70 with fluid pressure at the first end of the piston 58. (Trapping of hydraulic fluid between the modulator disc 74 and cap 66, which might interfere with variations in the volume of the expansion chamber 70, is prevented by a relief opening 78, FIG. 5, formed through the cap 66.)

A seal between the first end 62 of the piston 58 and the seat 54 in a closed position of the piston in which the end thereof is adjacent the seat 54 is provided by a tubular, elastomeric sealing ring 75 having a tubular body portion 77 that fits the opening 72 in the first end 62 of the piston 58 and flanges 79 and 81 that engage the shoulder 73 and end 62 respectively. The flange 81 has a diameter larger than the barrel 84 so that, in the closed position of the piston 58, shown in FIGS. 4 and 5, portions of the flange 81 will be clamped between the end 62 of the piston 58 and the seat 54 to form a seal that prevents escape of fluid from the outlet 20 to the inlet 16 about the piston 58. The seal so formed is enhanced by fins 82 formed on the outer tubular surface of the barrel 60 to support the flange 81 against fluid pressure in the outlet 20.

In order to urge the piston 58 toward the closed position, portions of the cap 66 adjacent the second end 68 of the piston 58 are formed on a reduced diameter to receive a piston spring 80 that urges the piston 58 toward the first end 48 of the bore 44 to seat the flange 81 against the valve seat 54 when pressure in the outlet 20 is below a preselected value. Thus, below such value, fluid flow through the bore 44 is blocked by the seating of the flange 81 against the valve seat 54. Above such pressure, the piston 58 will be forced to an open position, shown in FIG. 6, in which the first end 62 of the piston 58 is displaced from the valve seat 54 so that fluid may escape from the outlet 20 to the inlet 16 about the flange 81 and piston 58.

OPERATION OF THE PREFERRED EMBODIMENT

FIGS. 4 through 6, to which attention is now invited, particularly illustrate the operation of the bypass valve 56. In the practice of the invention, the springs 76 and 80 are selected to have different spring constants, the spring constant of the spring 80 being larger than the spring constant of the spring 76. Thus three pressure ranges in the pump outlet 20 are determined for the bypass valve 12. In the lowest range, the bypass valve 12 has the configuration shown in FIG. 4 in which the first end 62 of the piston 58 is urged toward the valve seat 54 by the spring 80 so that flange 81 forms a seal between the piston 58 and seat 54 and the modulation disc 74 is forced against the flange 79 by the modulation spring 76.

Should a surge in the pressure at the pump outlet 20 occur, so that the pressure is in an intermediate range, the sealing between the piston 58 and the valve seat 54 will be maintained by the spring 80. However, since the spring 76 has a lower spring constant than the spring 80, the modulator disc 74 can be driven toward the second end 64 of the piston 58, as shown in FIG. 5, so that the effect of the surge will be to increase the volume of the expansion chamber 70 by an amount that is proportional to the pressure in the pump outlet 20, thereby modulating the pressure in the pump outlet 20 and storing fluid in the expansion chamber 70 until the cause of the surge is eliminated. Thus, temporary resistance to fluid flow from the pump outlet 20 will not interfere with the pumping of hydraulic fluid from the inlet 16 to the pump outlet 20. Rather, a constant pumping rate is maintained by the pump 10 with temporary storage of the pump effluent in the expansion chamber 70.

The third pressure range occurs when a blockage of fluid flow from the pump outlet 20 occurs. This might happen, for example, when the pump 10 is being used to drive a hydraulic motor and, for some reason, the motor is stopped. In this case, movement of the modulator disc 74 toward the second end 64 of the piston 58 will continue until the spring 76 is maximally compressed by the continued build-up of fluid pressure in the pump outlet 20 occasioned by trapping of the pumped fluid in the pump outlet 20 and hydraulic conduits leading to the system being operated by the pump 10. Thus, pressure can rise in the pump outlet 20 to the aforementioned pressure at which the pressure overcomes the spring 80 to drive the piston 58 away from the valve seat 54 as illustrated in FIG. 6. In such configuration of the bypass valve 12, hydraulic fluid drawn into the inlet 16 of the pump 10 and delivered to the pump outlet 20 will flow about the flange 81 and the piston 58 to be returned to the pump inlet 16 via the duct 53.

It will be clear that the present invention is well adapted to carry out the objects and attain the advantages mentioned as well as those inherent therein. While a presently preferred embodiment of the invention has been described for purposes of this disclosure, numerous changes can be made which will readily suggest themselves to those skilled in the art and which are encompassed within the spirit of the invention disclosed and as defined in the appended claims.

What is claimed is:

1. A bypass valve for a displacement pump having a housing wherein a pump inlet and pump outlet are formed, the bypass valve comprising:

a bore formed through portions of the housing between the pump inlet and the pump outlet, the bore extending from a first end thereof opening to the pump outlet to a closed second end thereof;
   a valve seat formed in the housing about portions of the bore adjacent the first end thereof;
   a duct formed through the housing between the closed end of the bore and the pump inlet;
   a piston having opposite first and second ends, the piston disposed in the bore for sliding movement therein from a closed position of the valve to an open position of the valve, in the closed position of the valve the first end of the piston being disposed adjacent the valve seat, in the open position the first end of the piston being displaced from the valve seat, the piston having a cylindrical expansion chamber and an opening through the first end of the piston to communicate fluid pressure in the pump outlet to the expansion chamber;
   means for forming a seal between the first end of the piston and the valve seat when the valve is in the closed position;
   a piston spring disposed in portions of the bore between the second end thereof and the second end of the piston for urging the piston against the valve seat; and
   means for varying the volume of the expansion chamber in relation to fluid pressure in the pump outlet, comprising:
   a modulator disc disposed in the expansion chamber for sliding movement toward and away from the opening in the expansion chamber; and
   a modulator spring disposed in the expansion chamber between the second end of the piston and the modulator disc for urging the modulator disc toward the first end of the piston, the modulator spring having a spring constant lower than the spring constant of the piston spring.

2. In a displacement pump bypass valve having a spring-loaded piston slideably disposed in a bore fluidly communicated at the ends thereof with the pump inlet and the pump outlet for selectively blocking fluid flow through the bore and opening the bore for release of excessive fluid pressure in the pump outlet, the improvement comprising:

an expansion chamber formed in the piston, the piston having an opening formed through one end thereof for transmitting fluid pressure from the pump outlet to the expansion chamber; and
   means for varying the volume of the expansion chamber in relation to fluid pressure in the pump outlet, the means for varying the volume of the expansion chamber comprising:
   a modulator disc disposed in the expansion chamber for sliding movement therein toward and away from the opening in the one end of the piston; and
   means for urging the modulator disc toward the opening in the piston.

3. A bypass valve for a displacement pump having a housing wherein a pump inlet and pump outlet are formed, the bypass valve comprising:

a bore formed through portions of the housing between the pump inlet and the pump outlet, the bore extending from a first end thereof opening to the pump outlet to a closed second end thereof;
   a valve seat formed in the housing about portions of the bore adjacent the first end thereof;

a duct formed through the housing between the closed end of the bore and the pump inlet;

a piston having opposite first and second ends, the piston disposed in the bore for sliding movement therein from a closed position of the valve to an open position of the valve, in the closed position of the valve the first end of the piston being disposed adjacent the valve seat, in the open position of the first end of the piston being displaced from the valve seat, the piston having a cylindrical expansion chamber and an opening through the first end of the piston to communicate fluid pressure in the pump outlet to the expansion chamber, the piston comprising:

a tubular barrel having a first end at the first end of the piston and an open, opposite second end; and a cup-shaped cap fitting over the second end of the barrel;

means for forming a seal between the first end of the piston and the valve seat when the valve is in the closed position;

a piston spring disposed in portions of the bore between the second end thereof and the second end of the piston for urging the piston against the valve seat; and means for varying the volume of the expansion chamber in relation to fluid pressure in the pump outlet, and comprising:

a modulator disc disposed in the expansion chamber for sliding movement toward and away from the opening in the expansion chamber; and a modulator spring disposed in the expansion chamber between the second end of the piston and the modulator disc for urging the modulator disc toward the first end of the piston, the modulator spring having a spring constant lower than the spring constant of the piston spring.

4. A bypass valve for a displacement pump having a housing wherein a pump inlet and pump outlet are formed, the bypass valve comprising:

a bore formed through portions of the housing between the pump inlet and the pump outlet, the bore extending from a first end thereof opening to the pump outlet to a closed second end thereof;

a valve seat formed in the housing about portions of the bore adjacent the first end thereof;

a duct formed through the housing between the closed end of the bore and the pump inlet;

a piston having opposite first and second ends, the piston disposed in the bore for sliding movement therein from a closed position of the valve to an open position of the valve, in the closed position of the valve the first end of the piston being disposed adjacent the valve seat, in the open position of the first end of the piston being displaced from the valve seat, the piston having a cylindrical expansion chamber and an opening through the first end of the piston to communicate fluid pressure in the pump outlet to the expansion chamber, the piston comprising:

a tubular barrel having a first end at the first end of the piston and an open, opposite second end; and a cup-shaped cap fitting over the second end of the barrel;

means for forming a seal between the first end of the piston and the valve seat when the valve is in the closed position;

a piston spring disposed in portions of the bore between the second end thereof and the second end of the piston for urging the piston against the valve seat; and means for varying the volume of the expansion chamber in relation to fluid pressure in the pump outlet.

5. A piston assembly for a bypass valve, comprising:

a piston having a first end and an opposite second end, the piston defining an expansion chamber between the first and second ends thereof and having an opening formed through the first end therefor for establishing fluid communication between the first end of the piston and the the expansion chamber being cylindrical in form and extending axially between the first and second ends of the piston, the piston further comprising:

a tubular barrel having a first end at the first end of the piston and an open, opposite second end; and a cup-shaped cap fitting over the second end of the barrel;

means for varying the volume of the expansion chamber in relation to fluid pressure at the first end of the piston and comprising:

a modulator disc disposed in the expansion chamber for axial movement therein toward and away from the opening through the first end of the piston; and spring means disposed in the expansion chamber between the modulator disc and the second end of the piston for urging the modulator disc toward the first end of the piston.

6. A piston assembly for a bypass valve, comprising:

a piston having a first end and an opposite second end, the piston defining an expansion chamber between the first and second ends thereof and having an opening formed through the first end thereof for establishing fluid communication between the first end of the piston and the expansion chamber, the piston comprising:

a tubular barrel having a first end at the first end of the piston and an open, opposite second end; and a cup-shaped cap fitting over the second end of the barrel;

means for varying the volume of the expansion chamber in relation to fluid pressure at the first end of the piston.

* * * * *